United States Patent [19]
Moore

[11] 3,807,929
[45] Apr. 30, 1974

[54] FLUID OPERATED CLAMPING DEVICE FOR BLOW MOLDING APPARATUS

[75] Inventor: Lawrence A. Moore, King of Prussia, Pa.

[73] Assignee: Beloit Corporation, Beloit, Wis.

[22] Filed: Feb. 22, 1972

[21] Appl. No.: 228,048

[52] U.S. Cl...... 425/387 B, 425/450, 425/DIG. 205
[51] Int. Cl............................................ B29d 23/03
[58] Field of Search.......... 425/DIG. 205, DIG. 203, 425/387 B, 450, 324 B, 326 B, 242 B

[56] References Cited
UNITED STATES PATENTS

| | | | |
|---|---|---|---|
| 3,103,701 | 9/1963 | Calchera et al............ | 425/DIG. 205 |
| 3,277,534 | 10/1966 | McDonald et al. ............. | 425/387 B |
| 3,344,470 | 10/1967 | Hufford.......................... | 425/326 B |
| 3,396,428 | 8/1968 | Tahara....................... | 425/DIG. 205 |
| 3,559,235 | 2/1971 | Hagen....................... | 425/DIG. 205 |
| 3,642,410 | 2/1972 | Bourgeois........................ | 425/387 B |

FOREIGN PATENTS OR APPLICATIONS 1,110,732   4/1968   Great Britain

Primary Examiner—Richard B. Lazarus
Attorney, Agent, or Firm—Larson, Taylor and Hinds

[57] ABSTRACT

A blow molding apparatus in which the blow mold halves are closed by means of a hydraulic piston and cylinder unit. Each one of a pair of slidably mounted carriages has fixed thereto for movement therewith either the piston or the cylinder plus one of the mold halves, whereby upon relative movement of the piston and cylinder, the mold halves open and close relative to each other. The path of movement of the mold halves is parallel to and spaced laterally from the path of relative movement of the piston and cylinder.

11 Claims, 5 Drawing Figures

FLUID OPERATED CLAMPING DEVICE FOR BLOW MOLDING APPARATUS

BACKGROUND OF THE INVENTION:

This invention relates to a blow molding apparatus and in particular it relates to a fluid operated clamping device for closing and opening the mold halves.

In a blow molding apparatus, a means must be provided for moving the mold halves towards and away from each other.

In blow molding, it is customary to extrude a tube of plastic polymer material. This tube is either delivered directly to the blow molding apparatus (the hot parison process) or cooled, stored and subsequently reheated for delivery to the blow molding apparatus (the cold parison process). By either process, a heated parison is eventually positioned between mold halves which close onto the parison to enclose the parison in a closed mold cavity, the shape of which cavity represents the shape of the article to be formed. An air pressure differential is then created in the parison to force the same outwardly against the walls of the mold cavity. This pressure differential is normally accomplished by blowing pressurized air into the parison within the mold but it may also involve creating a vacuum on the exterior of the parison.

When working with parisons, it is preferable to arrange the mold halves so that they are movable simultaneously towards and away from the parisons such that on closing, the mold halves meet on a plane passing through the central axis of the parison. Another requirement of such a blow molding apparatus is that it be capable of exerting very high forces to close the mold halves against each other.

A blow molding apparatus having a clamping device meeting the above requirements is shown in my co-pending application Ser. No. 3,003, filed Jan. 15, 1970, which application is incorporated by reference herein. That application is concerned with a cold parison blow molding apparatus in which the blow molding apparatus is positioned adjacent a parison heating oven and a transfer arm carries heated parisons from the oven to the mold. In that application, the blow mold includes a pair of mold halves slidably mounted for movement towards and away from each other. Power is provided by a rotary Rotac unit manufactured by the Excello corporation in combination with a curved linkage arrangement for converting the rotary movement of the Rotac unit into sliding movement of the mold halves.

However, while the said previous arrangement both provides simultaneous movement and is capable of exerting a high force, it still suffers from a number of disadvantages. For example, this previous arrangement is rather bulky, thus making it more difficult to position this device in conjunction with other parts of an overall parison handling and blow molding system. In addition, this previous arrangement is relatively expensive. Further, with this previous arrangement it was not possible to exercise any degree of control over the movement of the mold halves to vary such movement, for example for different operating conditions such as different mold thicknesses, or other conditions which might require different mold closing speeds, etc.

A solution to the above problems involves the use of a fluid operated piston and cylinder unit in place of the rotary unit for operating the mold halves. Previously known arrangements using hydraulic piston and cylinder units for operating the mold halves are shown for example in the U.S. Pat. No. 3,344,470 and the British Pat. No. 1,110,732. However, the clamping devices shown in these patents are still relatively bulky and hence do not overcome all of the disadvantages of the rotary clamping device.

Thus, there exists a need for a new and improved clamping device for a blow molding apparatus which is compact, relatively simple and hence somewhat inexpensive and also capable of being controlled to be adapted for different operating conditions.

SUMMARY OF THE INVENTION:

Thus, it is a purpose of this invention to provide a new and improved clamping device for a blow molding apparatus which overcomes the disadvantages of the prior art.

This purpose of the present invention is achieved by providing a clamping device for a blow molding apparatus of the type in which both mold halves are simultaneously movable as the mold closes and opens wherein the force for closing and opening the mold is applied to the mold halves via a fluid piston and cylinder unit. Preferably this will be a hydraulic piston and cylinder unit. The piston and cylinder are mounted for relative sliding movement and the mold halves are fixedly connected one to the piston and one to the cylinder, and the mold halves are arranged to move in their opening and closing movements through a path which is generally parallel and spaced from the path of relative movement of the piston and cylinder unit.

It has been found that such an arrangement can be made inexpensively and compactly. Owing to its compactness, the piston and cylinder unit may be placed very close to the mold, thereby reducing the moment arm between the piston and cylinder unit and the mold halves and thereby also reducing the deflection of such arms upon opening and closing of the mold. Further, a fluid operated piston and cylinder unit is such that the applied pressure can be varied, thus making it possible to vary the applied force, the speed of opening and closing the mold and also it is possible to compensate for molds of various thicknesses.

In accordance with a preferred embodiment of the present invention, a frame is provided with support means for mounting a pair of carriages for sliding movement therealong. The piston is fixedly connected to one of these carriages and extends into a cylinder fixedly connected in the other carriage. A pair of arms extend outwardly, one from each carriage, each arm connected to one of the mold halves. Thus, by introducing fluid into the cylinder, the piston is moved relative to the cylinder, thus moving the carriages relative to each other and hence also moving the two mold halves relative to each other. Preferably, the cylinder is a double-acting cylinder such that the introduction of fluid on one side of the piston opens the mold and the introduction of fluid on the other side of the piston closes the mold. A suitable linkage means interconnects the two carriages to synchronize their movements relative to each other.

Thus, it is an object of this invention to provide a new and improved clamping device for the mold halves of a blow molding apparatus.

It is another object of this invention to provide a new and improved clamping device for a blow molding apparatus which is compact and inexpensive relative to clamping devices known heretofore.

It is another object of this invention to provide a blow molding apparatus having a clamping device which can be controlled to be adapted to different operating conditions such as different closing speeds and different size mold halves.

It is another object of this invention to provide a new and improved clamping device for a blow molding apparatus comprising a piston and cylinder unit mounted for relative movement, each of said piston and cylinder being fixedly connected to one of the mold halves such that relative movement of the piston and cylinder along a first path cause the mold halves to open and close, moving along a second path which is generally parallel to the path of the piston and cylinder unit.

It is another object of this invention to provide a new and improved clamping device for a blow molding apparatus comprising a frame, a pair of carriages mounted for sliding movement on this frame, a piston fixedly connected to one of these carriages and extending into a cylinder fixedly connected on the other of these carriages, and including an arm extending one from each of these carriages, each of said arms being connected to one of the mold halves, whereby upon sliding movement of the carriages under the action of the piston and cylinder unit, the mold halves open and close onto each other.

Other objects and the advantages of the invention will become apparent from the detailed description to follow, together with the accompanying drawings.

BRIEF DESCRIPTION OF THE DRAWINGS:

There follows a detailed description of a preferred embodiment of the invention to be read together with the accompanying drawings, which are provided only as an illustration of a preferred embodiment of the invention.

FIG. 5 is a schematic view of a hydraulic circuit for use with the present invention.

Figure 1:
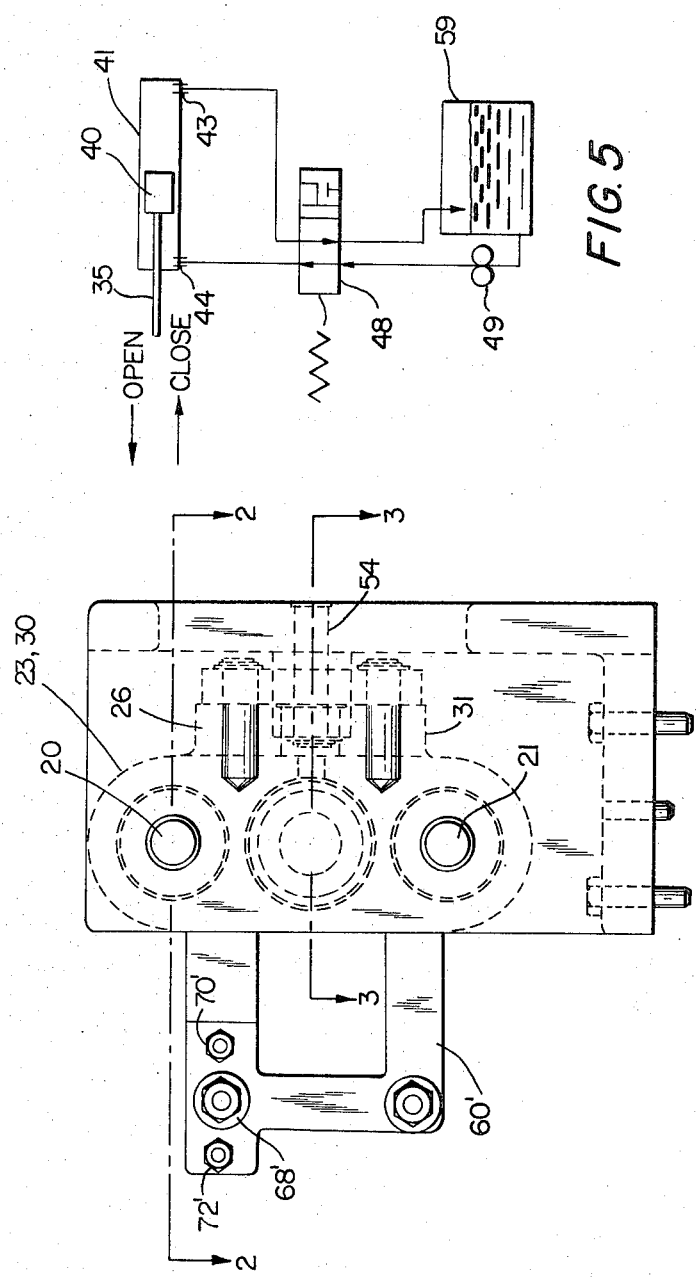
FIG. 1 is an end elevational view of a blow molding apparatus including a clamping device constructed in accordance with the present invention.

DETAILED DESCRIPTION OF THE PREFERRED EMBODIMENT:

Referring now to the figures, like elements are represented by like numerals throughout the several views.

The figures and the following description illustrate and describe only the clamping device itself in detail and the mold halves schematically. The other features which would be used in the operation of the blow molding apparatus such as the means for introducing air into the parison, etc. are known per se and are hence omitted here for purposes of clarity. However, for a detailed description of such additional features, reference is made to my said copending application Ser. No. 3,003.

Referring now to the present drawings, the clamping device includes a frame which is generally U-shaped when viewed from above and includes a back wall 11 and side walls 12 and 13. Cut-outs 16 and 17 are formed in the back wall 11. Suitable bolts 15 are provided for attaching the frame to a suitable stationary base.

Upper and lower support rods 20 and 21 extend completely across the frame and are connected to each of the side walls 12 and 13. The end of both of these rods are visible in FIG. 1 while the entire length of rod 20 is visible in FIG. 2.

A first carriage 22 is mounted for sliding movement on the two rods 20 and 21. This carriage includes an outer member 23, the outline of which is visible in FIG. 1 and a pair of sliding members 24 fixedly connected to the outer members 23 by dowel pins 25. The first of these sliding members, which is shown in FIG. 2, is mounted to slide along the fixed support rod 20. Another similar sliding member would be similarly connected to the outer member 23 and mounted for sliding movement along the lower support rod 21. The carriage 22 also has fixed thereto a raised boss 26 adapted to be connected to a linkage means which will be described below. Also connected to the carriage 22 is a piston rod 35 which will also be described in greater detail below.

The apparatus further includes a second carriage 30 mounted to slide along the outer surface of the two sliding members 24. This carriage includes a raised boss 21 which is connected to a linkage means to be described below.

Figure 2:
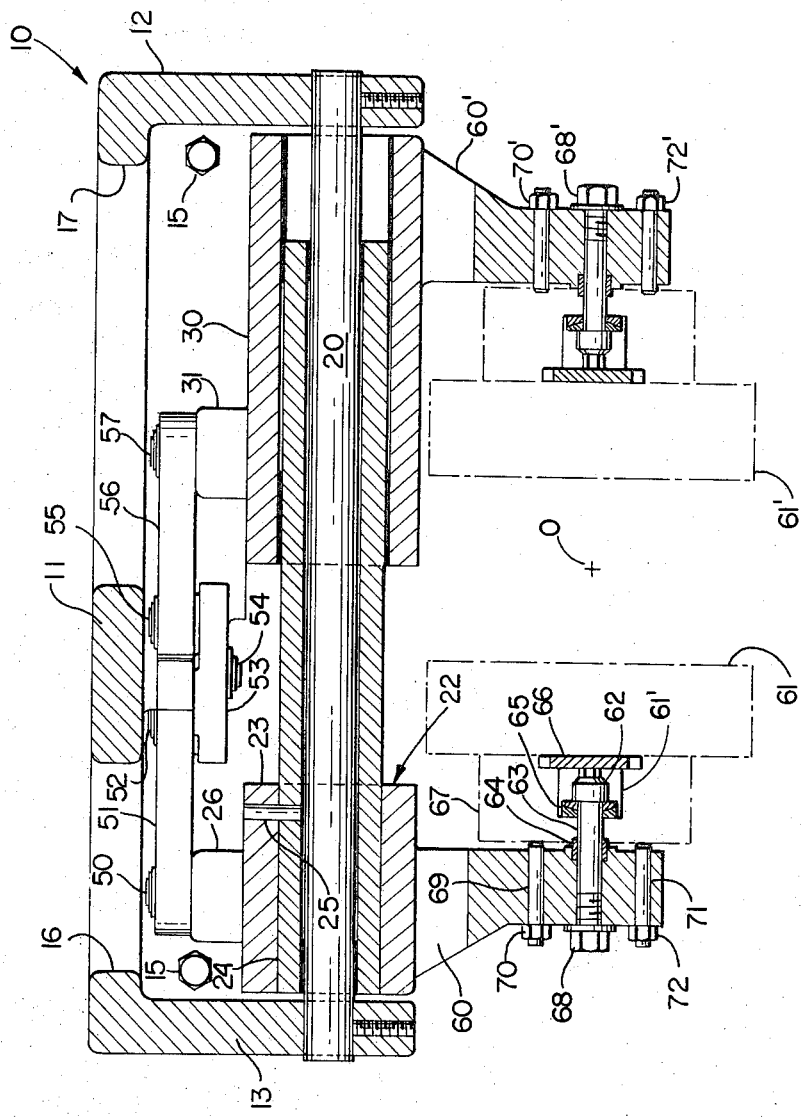
FIG. 2 is a sectional view taken along line 2—2 of FIG. 1.
Figure 3:
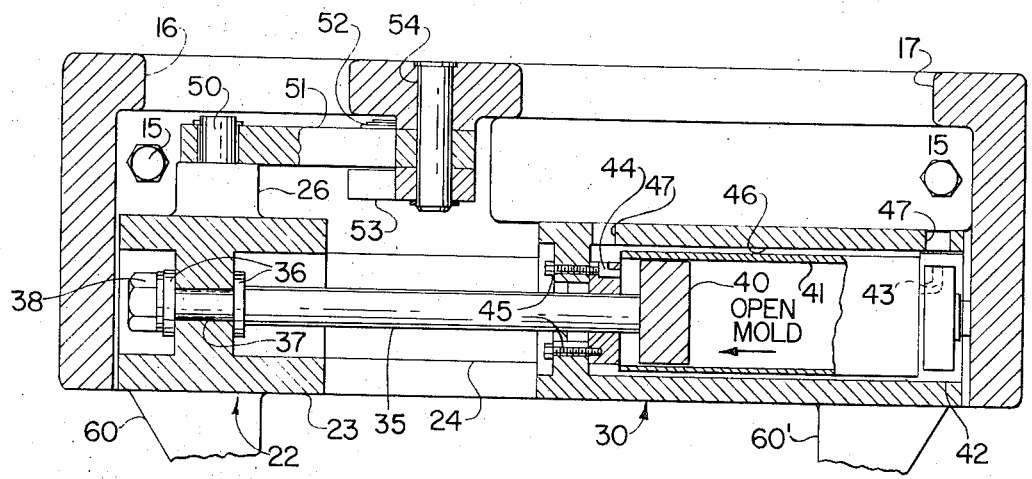
FIG. 3 is a sectional view taken along line 3—3 of FIG. 1.

Referring to FIGS. 1 and 3, there is provided between the two support rods 20 a piston and cylinder unit. A piston rod 35 is secured by threading 37, suitable washers 36 and a nut 38 to the portion 23 of the carriage 22. At its other end, the piston rod 35 has fixed thereto a piston head 40. This piston head is positioned within a cylinder 41 which is in turn fixed by means of bolts 45 within a large cavity 46 within the carriage 30. The cylinder includes a fluid passage 43 for delivering pressurized fluid to the righthand side of the cylinder 41 for urging the carriages apart to open the mold and a fluid passage 44 on the left-hand side of the cylinder for introducing fluid thereto to move the piston 40 to the right to close the mold. The carriage 30 includes suitable large openings 47 through which flexible fluid lines (not shown) can be inserted for fluid tight connection to the respective passages 43 and 44.

FIG. 5 illustrates a hydraulic system for operating the piston and cylinder unit of the present invention. The system includes a two-way valve 48 for interconnecting the piston and cylinder unit with pump 49 and reservoir 59. In the illustrated position, the pressurized fluid is delivered from pump 49 through the valve 48 to opening 44 to the left side of the piston head 40, urging the same to the right to close the mold. To open the mold, the valve 48 is pushed to the other position, connecting both sides of the cylinder to the pump and neither side to reservoir 59. The equal pressure hydraulic fluid on both sides of the piston 40 will then have a greater surface area on the right side of piston 40 than the left side of piston 40, owing to the area taken up by the rod on the left side, as a result of which the piston 40 will move to the left to open the mold. This regenerative circuit has the advantage that it uses much less oil per cycle and can be operated faster. Of course the resultant force to the left to open the mold is smaller than would be the case if the right side of piston 40 were opened to the reservoir, but such additional force is not necessary simply for opening the mold. In this case obviously the fluid from the left side of the cylinder flows around to the right side thereof through the valve to fill the enlarging space therein as the mold opens.

Figure 4:
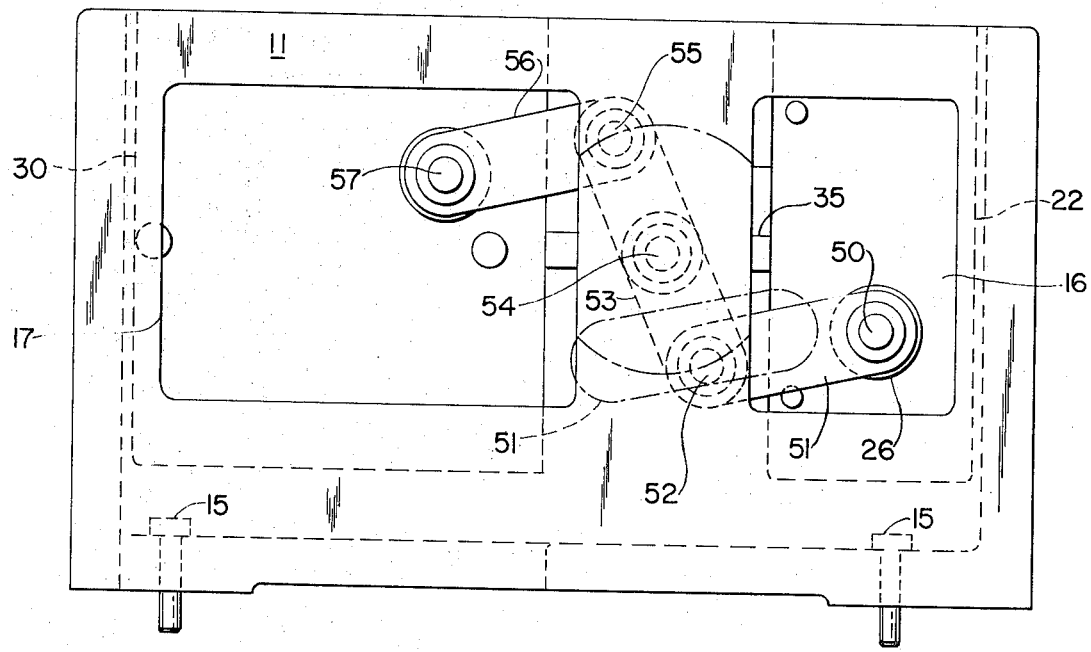
FIG. 4 is a rear elevational view looking toward the righthand side of FIG. 1.

To assure proper relative movement of the carriages 22 and 30, these carriages are synchronized by a suitable linkage system. A protrusion 50 extends rearwardly from the boss 26 and has pivotably mounted thereon an outer link 51 which link is pivotably connected at its other end to a floating pivot pin 52 which also has pivotably connected to it one end of a central link 53. At its center, this central link 53 is pivotably mounted on a pivot pin 54 which is fixed in the back wall 11 of the frame. At its end opposite from floating pivot pin 52 the link 53 is connected to a second outer link 56. At its other end, link 56 is pivotably connected on a protrusion 57 which extends rearwardly from boss 31. In the figures, the mold is in the open condition. However, to illustrate the position of the links when the mold is closed, the closed position of link 51 is shown in dotted lines in FIG. 4.

The carriage 22 has fixed thereto and extending outwardly therefrom a support arm 60 which supports a mold half 61. A second support arm 60' is fixed to and extends outwardly from the carriage 30 and has attached thereto the other mold half 61'. The means for connecting the support arms to the mold halves are the same on both sides and therefore only the connecting means associated with the arm 60 and the mold half 61 will be described in detail. A main bolt 63 has a head 62 located against a self-aligning washer 65 in a recess 62' in a platen 67 which is fixed to the mold half 61. A wrench 66 is shown engaged with the bolt 63. At its outer end, this bolt 63 which is threadedly engaged in the arm 60 is received and tightened by a nut 68. The bolt 63 is further supported by means of an insert 64. To prevent rotation of the platen 67 and hence also the mold half 61 about the axis of bolt 63, a pair of additional bolts 69 and 71 are provided on each side of bolt 63, each of these fixed into the platen 67 and engaged by nuts 70 and 72, respectively.

It is believed that the operation of the present invention will be apparent from the preceding discussion of the preferred embodiment thereof. However, for clarity, the operation will be briefly summarized. With the mold halves in the open position as shown in the figures, a parison is brought into place centrally between the mold halves with its axis corresponding to the point 0 in FIG. 2. While the mold is opened, the valve 48 is in the position opposite from that shown in FIG. 5 so that the resultant force of the pressurized hydraulic fluid from hydraulic pump 49 on both sides of piston 40 urges the piston 40 to the left. After the parison is properly positioned and secured, the valve 48 is moved to the position as shown in FIG. 5 wherein pressurized fluid is delivered to the opening 44 to move the piston 40 to the right, during which time fluid is drained through the line 43 and through the valve 48 to the reservoir 59.

As is evident from the figures, the apparatus is rather compact relative to previously known apparatus for applying closing and opening forces to mold halves. One advantage of this compactness is that the moment arm, i.e., the distance from the path of the piston and cylinder to the center line of the mold halves is relatively short and this greatly enhances the efficiency and minimizes deflection upon opening and closing. It is another advantage of this invention that the pressure of the fluid applied to 43 and 44 to move the piston 40 can be varied, thus varying the applied force and the speed of opening and closing the mold. This may be accomplished, by example, by making the pump 40 a variable pressure pump.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A blow molding apparatus comprising:
   a frame,
   a piston and cylinder unit mounted on said frame for relative movement back and forth along a first path,
   a first arm rigid with the piston and extending transversely of said first path, a mold half rigidly connected to said first arm, a second arm rigid with the cylinder and extending transversely of said first path, a mold half rigidly connected to said second arm,
   the two mold halves being positioned on their respective arms to move relatively along a second path which is spaced transversely from and is parallel to the first path,
   means for introducing pressurized fluid into the piston and cylinder unit at least to move the mold halves together to close the mold
   and further including a linkage means operatively connected to the frame and interconnecting the piston and cylinder for synchronizing movement of the piston and cylinder, and hence also of the mold halves, towards and away from each other.

2. A blow molding apparatus according to claim 1, said piston and cylinder being relatively movable linearly whereby said first path is a straight line path and said second path is a straight line path parallel to the first path.

3. A blow molding apparatus according to claim 2, wherein both the piston and the cylinder are movable along said first path.

4. A blow molding apparatus according to claim 1, said piston and cylinder being a double-acting piston and cylinder unit, and said means for introducing pressure fluid includes means for introducing fluid to force the piston in one direction relative to the cylinder to open the mold and in the other direction relative to the cylinder to close the mold.

5. A blow molding apparatus comprising:
   a frame,
   first and second carriages mounted on said frame for relative movement along a first path toward and away from each other,
   a piston rod fixed to the said first carrigage,
   a cylinder fixed to the second carriage, the piston rod having a piston located in said cylinder and movable therein relative to the cylinder to cause movement of the first and second carriages relative to each other along said first path,
   two support arms, each rigid with and extending from one carriage in a direction transverse to the direction of said first path, means on each of the two support arms for fixedly mounting thereon a pair of mating mold halves, such that as the carriages move relatively towards and away from each other along said first path, the mating mold havles close against each other and open away from each other, respectively, along a second path which is generally parallel to and spaced transversely from the first path, and further including a linkage means operatively connected to the frame and interconnecting the carriages for synchronizing movement of the carriages, of the piston and cylinder, and hence also of the mold halves, towards and away from each other.

6. A blow molding apparatus according to claim 5, wherein both said paths are straight line paths, both of said carriages are movable during said movement towards and away from each other.

7. A blow molding apparatus according to claim 6, wherein said frame comprises a back wall and a pair of side walls extending in the same direction from the back wall, at least one straight support rod connected to and extending between the side walls, said carriages being mounted on said support rod for movement therealong.

8. A blow molding apparatus according to claim 7, including a pair of said support rods parallel to each other, said piston and cylinder extending parallel to the support rods and located between them.

9. A blow molding apparatus according to claim 8, said linkage means comprising a pivot pin fixed to the back wall of the frame, a central link pivotably mounted on the fixed pivot pin and including a pair of outer links, each outer link pivotably connected to the central link, one outer link connected at its other end to one of said carriages and the other outer link connected at its other end to the other of said carriages.

10. A blow molding apparatus according to claim 5, wherein said means on each of the support arms for fixedly mounting a mold half thereto comprises a central bolt and a pair of side bolts spaced from the central bolt to prevent rotation of the mold half about the axis of the central bolt, all said bolts extending generally parallel to the direction of movement of the mold halves towards and away from each other.

11. A blow molding apparatus according to claim 5, said piston and cylinder being a double-acting piston and cylinder unit, means for introducing pressurized fluid into the cylinder on the side of the piston head at which the piston rod is located and draining the other side of the cylinder to reservoir to close the mold, and means for connecting both sides of the cylinder to a pressure source and neither of said sides to reservoir to open the mold whereby the piston head will move in the direction towards the piston rod because of the greater force resulting from the greater area on the side of the piston head opposite from the piston rod.

* * * * *